(12) United States Patent
Hosford (10) Patent No.: US 6,520,752 B1
(45) Date of Patent: Feb. 18, 2003

(54) PUMPS AND FILTER ASSEMBLIES WITH APPLICATION TO AQUATIC AND OTHER ENVIRONMENTS

(76) Inventor: James Peter Hosford, Langmoor Manor, Chammouth, Bridgport, Dorset DT6 6BU (GB)

(*) Notice: Subject to any disclaimer, the term of this patent is extended or adjusted under 35 U.S.C. 154(b) by 0 days.

(21) Appl. No.: 09/937,947

(22) PCT Filed: Mar. 23, 2000

(86) PCT No.: PCT/GB00/01109
§ 371 (c)(1),
(2), (4) Date: Oct. 2, 2001

(87) PCT Pub. No.: WO00/61258
PCT Pub. Date: Oct. 19, 2000

(30) Foreign Application Priority Data

Apr. 8, 1999 (GB) .............................. 9907880

(51) Int. Cl.[7] .................................. F04B 23/00
(52) U.S. Cl. .................. 417/313; 417/201; 417/423.5; 415/121.2
(58) Field of Search .............. 417/199.1, 201, 417/313, 413.9, 423.5; 415/121.2, 169.1

(56) References Cited

U.S. PATENT DOCUMENTS

| 3,574,509 A | 4/1971 | Zentis et al. | |
|---|---|---|---|
| 3,840,123 A | 10/1974 | McClure | |
| 4,210,539 A | * 7/1980 | Shiban | 210/391 |
| 5,565,012 A | 10/1996 | Buodd | |
| 5,733,464 A | * 3/1998 | Bunch | 210/791 |
| 5,815,544 A | 9/1998 | Lefter | |

FOREIGN PATENT DOCUMENTS

| DE | 195 10 686 A1 | 11/1995 |
|---|---|---|
| EP | 0 607 766 A1 | 7/1994 |
| GB | 1 280 607 | 7/1972 |
| GB | 2 212 861 A1 | 8/1989 |
| GB | 2 234 168 A | 1/1991 |
| GB | 2 256 599 A | 12/1992 |
| GB | 2 293 333 A | 3/1996 |
| JP | 62033509 A | 2/1987 |

* cited by examiner

Primary Examiner—Charles G. Freay
Assistant Examiner—John F Belena
(74) Attorney, Agent, or Firm—Brooks & Kushman P.C.

(57) ABSTRACT

A combined pump and filter assembly having backwashing apparatus for the filter assembly and apparatus for offsetting the tendency for an increase in pump output flow resistance to cause an increase in fluid flow to the backwashing assembly.

16 Claims, 5 Drawing Sheets

PUMPS AND FILTER ASSEMBLIES WITH APPLICATION TO AQUATIC AND OTHER ENVIRONMENTS

This invention relates to a method and apparatus related to pumps and filter assemblies. A particular application of the invention is to aquatic situations such as ponds and aquariums and the like, but the method and apparatus is applicable outside this field.

There is disclosed in our granted prior patent GB2 293 333B a pump and filter assembly having great practical utility in which provision is made for automatic backflushing of the filter by a corresponding flow of the liquid medium being filtered.

We have discovered that the assembly disclosed in our prior patent is susceptible of improvement in respect of the backflushing function as explained below.

We have determined that there would be benefit in providing an improved system for regulating the fluid pressure in the supplies from the pump assembly to, respectively, the pump output (typically a fountain or something of that sort in an aquatic situation), and the supply of fluid to the filter backflushing assembly itself.

Typically, what happens in normal usage with the prior system disclosed in GB 27293 333 is that when the back pressure on the main output line is increased, the flow to the backflushing system increases. This is because the backflushing supply is taken from a T-connection on the output from the pump, the increase in the resistance to the flow from the pump in the main output line therefore causes an enhanced flow to the backflushing assembly. In simple terms the pump output takes the line of lesser resistance, which with increased resistance in the main output line will be, to the backflush assembly. With increased resistance in the main output line however the overall outlet flow from and through the pump will decrease. This occurs particularly in the case of a centrifugal pump, where the pump output increases as the resistance in the pump output line decreases. Consequently there is less need for the backflushing since less overall flow is entrained into the assembly and so less blockage occurs. The increase in backflushing flow in this situation is therefore not required. In fact this increase in backflushing flow in this situation is undesirable since it diverts flow and pump effort from the main output line.

In the opposite situation when the resistance in the main output line decreases the reverse occurs. Namely the flow in the main output line increases and the backflushing flow will be reduced. Overall though the flow through the pump will increase. However with the overall flow increasing there is more likelihood of the filter being blocked and so what would ideally be required is an increase in the backflushing flow in such a situation.

It can therefore be seen that with the arrangement disclosed in GB 2,293,333 the changes in backflushing flow in response to changes in the main output line resistance and overall flow are the opposite of what would desirably be required.

Having discovered this latter factor, we have invented a solution to the problem whereby the tendency for the backflushing supply to increase when the main pump output resistance increases and the main output flow decreases, is at least partially offset and/or which provides improvements generally to pump and filter assemblies.

According to a first aspect of the present invention there is provided a combined pump and filter assembly as described in the appended claims 1 to 12.

According to a second aspect of the present invention there is provided a method of operating a combined pump and filter assembly as described in appended claims 13 to 16.

Accordingly, in its broadest aspect, the present invention seeks to provide a means whereby the tendency for the backflushing supply to increase when the main output is subjected to increased flow resistance, is offset at least in part.

In one embodiment, this offsetting effect is achieved by the provision of dual pumping means. In the embodiment, the increased flow resistance in the output from one of the pumping means (the main pumping means) reduces its output flow, but does not reduce to the same extent the output flow in the other pumping means. Where the dual pump means are entirely separate, there is effectively little or no output effect on the second pumping means, except if they have a common drive and the increased load on the main pump slows down the second pump.

The present invention will now be described by way of example only with reference to the following figures in which.

Figure 1:
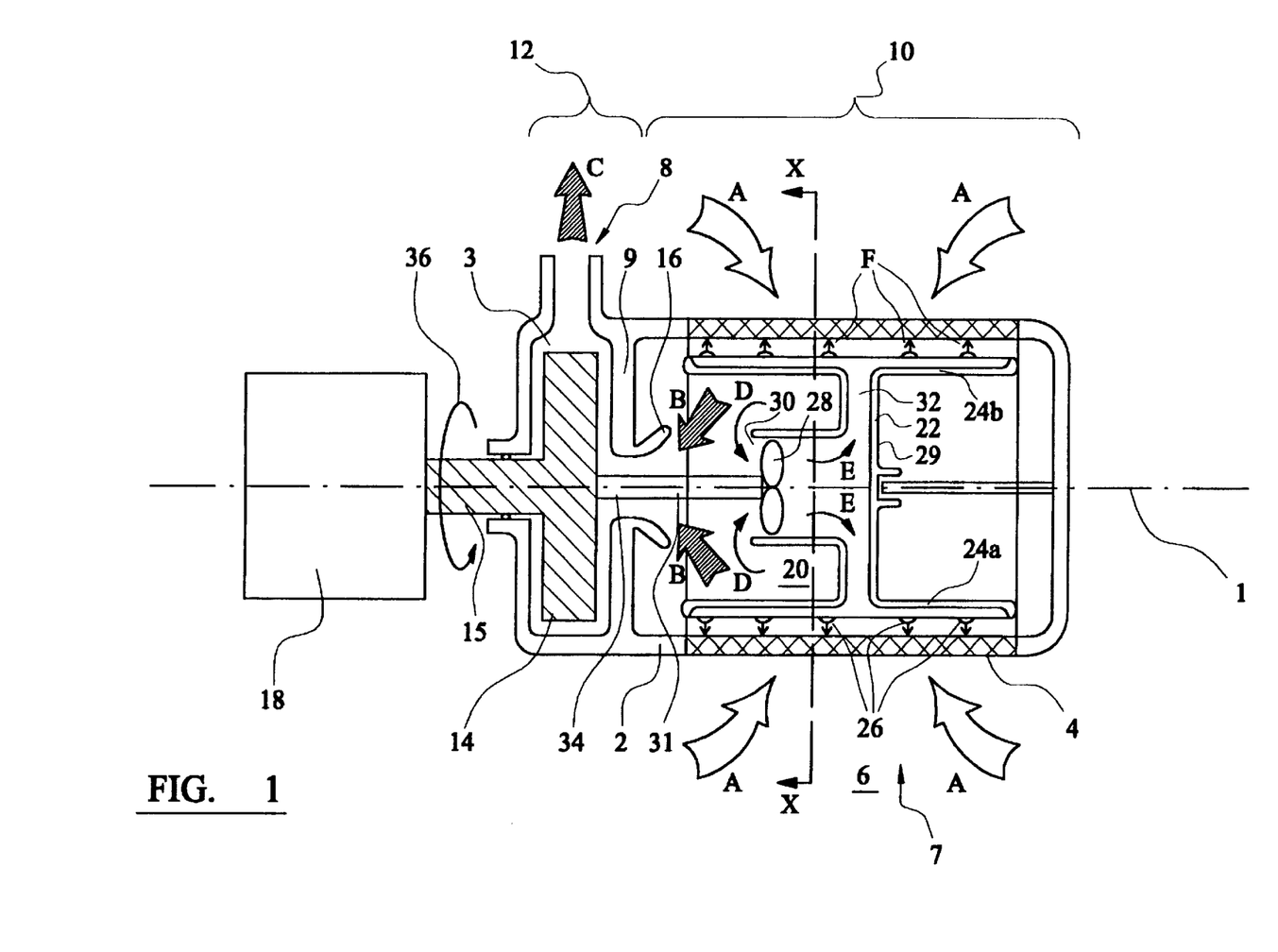
FIG. 1 is a schematic cross section of a pump and filter assembly according to the present invention.

Referring to FIG. 1 there is shown a combined pump and filter assembly 7 comprising a filter section 10 and a pump section 12 all housed within a generally cylindrical housing 2. The pump and filter assembly 7 is disposed about a central axis 1 with the filter section 10 towards one axial end and the pump section 12 towards the other. Within the housing 2 an internal partition 9 divides the pump section 12 from the filter section 10. A central passageway 16 is defined within the partition 9 interconnecting the filter section 10 with the pump section 12.

The pump section 12 is of a centrifugal type and comprises a rotary impellor 14 mounted inside the housing 2 and within a pump chamber 3 defined by the housing 2 and partition 9. The impellor 14 is arranged to rotate about the central axis 1, as shown by arrow 36, A shaft 15 extends from the impellor 14, through the housing 2, and drivingly connects the impellor 14 to a motor 18. The central passageway 16 provides the inlet to the pump section 12, whilst in a portion of the housing 2 radially outward of the impellor 14.there is an outlet 8.

The portion of the housing 2 of the filter section 10 and the partition 9 define an internal filter chamber 20. A portion of the housing 2 of the filter section 10 comprises a filter screen assembly 4. Typically this filter screen assembly 4 extends around a significant if not the entire circumference of the housing 2. The filter screen assembly 4 is of a conventional configuration and comprises a mesh or filter. The filter assembly 4 is arranged so that working fluid from a surrounding region 6 outside of the housing 2 can flow through the filter assembly 4 into the internal chamber 20, whilst any entrained solids, or particles above a certain size, within the working fluid are obstructed by the filter assembly 4 and are prevented from entering the internal chamber 20. Accordingly the flow of working fluid from the surrounding region 6 through into the internal chamber 20 is filtered by the filter assembly 4.

Figure 2:
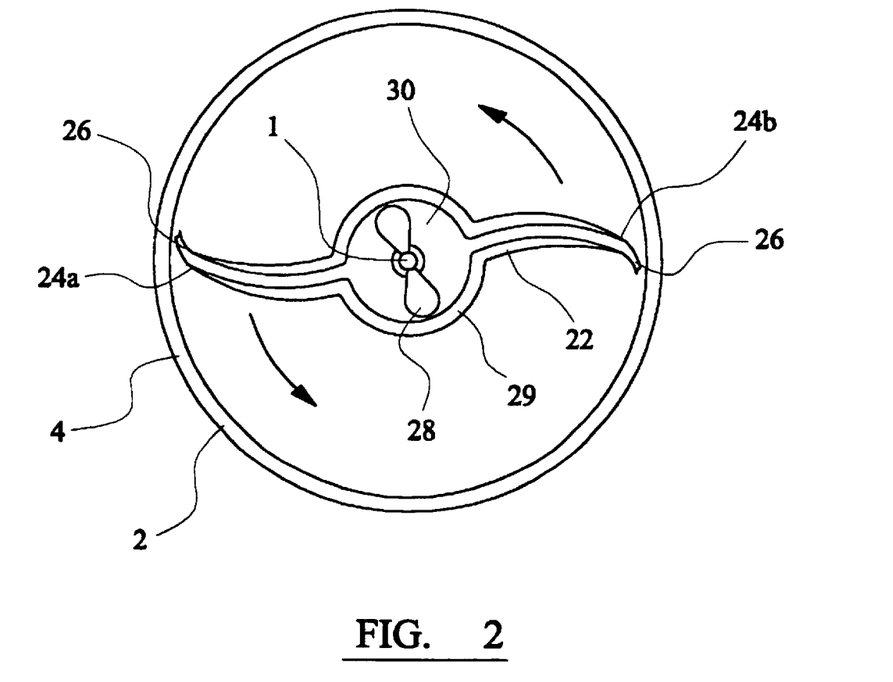
FIG. 2 is a schematic section along section X—X of the filter and pump assembly of FIG. 1.

A backwash assembly 29 is rotatably mounted about the central axis 1 within the filter chamber 20. The backwash assembly 29 comprises pair of arm members 22 which extend radially from a central hub. At the distil end of each of the arms 22 there is an axially extending rail member 24a, 24b. The backwash assembly 29 is mounted and configured such that the rail members 24a, 24b are in close proximity to the inside of the filter screen assembly 4 with the rail members 24a, 24b extending axially substantially over the axial length of the filter screen assembly 4. Conduits 32 for, in use, the passage of backwashing fluid are defined within the backwash assembly and extend from an inlet 30 in the central hub of the backwash assembly, through the arms 22 and along the rail members 24a, 24b. Along the length of each of the rail members 24a, 24b there are a series of nozzles 26 which are interconnected with the conduits 32. Whilst the nozzles 26 are directed radially outwardly towards the filter assembly 4, they are also angled relative to the radial direction and directed backward relative to the direction of rotation of the backwash assembly 29. By this arrangement, in use, backwashing fluid supplied to the conduit 32 will issue from the nozzles 32 and will be directed against the filter screen assembly 4. Furthermore this flow of backwashing fluid from the nozzles 26 will also provide a driving moment to rotate the backwashing assembly 29 about the central axis 1. As a result, as the backwashing assembly 29 rotates a stream of backwashing fluid will be directed via the nozzles 26 against the radially inside of the entire circumference of the filter assembly 4.

In fluid communication with the backwash assembly inlet 30 and filter chamber 20 there is a backwash supply pump means 31 which is distinct from the main pump 12. The backwash supply pump means 31 comprises a backwash impellor 28 which is rotatably mounted about the central axis 1, coaxially with and within the circular inlet 30 to the conduit 32 of the backwash assembly 29. The backwash impellor 28 is of an axial flow type. In this embodiment a backwash impellor shaft 34 drivingly interconnects the backwash impellor 28 to the main pump impellor 14 and so to the motor 18. Accordingly, in use, the backwash impellor 28 is rotated about the central axis 1, drawing in working fluid from the filter chamber 20, which is then directed into the backwash conduit 32 to provide a supply flow of backwashing fluid to the nozzles 26.

In operation the motor 18 drives and rotates the main pump impellor 14 and the backwash supply impellor 28. Working fluid, which may include entrained particles and debris, from the region 6 surrounding the assembly is then drawn into the filter section 10 through the filter screen assembly 4, as shown generally by arrows A. Working fluid passes through the filter screen assembly 4 whilst the debris and particles within the working fluid will be trapped by the filter assembly 4. The majority of the fluid passing through the filter screen assembly 4 and into the filter chamber 20 is then drawn into the suction side of pump section 12 through the central passageway 16 and inlet to the main pump as shown by arrow B. The main pump impellor 14 works on this fluid and the fluid is then discharged and pumped through the outlet 8, as shown by arrow C. A smaller proportion of the fluid within the filter chamber 20 however is entrained by the backwash impellor 28 into the backwashing assembly 29, as shown by arrow D to be used as backwashing fluid. This backwashing fluid is then driven and propelled by the backwash impellor through the conduits 32 in the backwash assembly 29 and out the nozzles 26 in the rail assemblies, as indicated by arrows E and F. This flow of fluid out of the nozzles 26 rotates the backwashing assembly 29 and backwashes the filter screen assembly 4. Backwashing occurring by virtue of the flow of fluid F from the nozzles 26 being directed in the reverse direction to the general flow direction through the filter assembly 4. Accordingly any particles and debris trapped in the filter assembly screen 4 will be dislodged and forced radially outwards, away from the filter screen assembly 4 by the nozzle flow F. The filter screen assembly 4 is thereby substantially kept clear and unobstructed.

As the main pump impellor 14 rotational speed increases, possibly as a result reduced resistance at the pump outlet 8, the overall flow of working fluid through the assembly 7 will increase. This increases the likelihood of the filter screen assembly 4 becoming blocked since more entrained particles and debris will be drawn into the filter assembly 4. With this arrangement and system 7 however a relationship is maintained between the rotational speed of the main pump impellor 14 and the backwashing impellor 28. This relationship is provided by linking the main pump impellor 14 and backwashing impellor 28 via shaft 34. Consequently as the main pump impellor 14 speed increases, the flow of backwashing fluid and backwashing of the filter screen assembly 4 will also be increased. This increased backwashing will offset the increased amount of entrained particles and debris drawn into the filter assembly 4 as a result of the increased flow. The required degree of backwashing and clearance of debris and entrained particles from the filter screen assembly 4 to keep the filter screen assembly 4 clear and unobstructed, is therefore provided automatically by this system 7. Furthermore by this arrangement since changes in the flow resistance at the pump output 8 will cause the pump impellor 14 to slow down, the backwashing impellor 28 will also slow and the backwashing flow will be reduced. Consequently the configuration of the system provides a means for offsetting the tendency for an increase in the output resistance at the pump outlet 8 to cause an increase in fluid flow to the backwashing assembly 29. Accordingly this addresses the above mentioned problem with the current prior art type of arrangements discussed above.

The problems of the backwashing flow and main pump output 8 flow effecting each other, which are present with the conventional arrangements are also mitigated and reduced in the present invention by the backwashing flow being drawn and provided from the suction, inlet, side of the pump section 12. This can be contrasted with the previous conventional arrangement, described in GB 2,234,168, in which the backwashing flow is drawn from the pressure side and outlet of the main pump.

Further advantages of the arrangement according to present invention are that it is a simple, combined pump and filter unit which utilises the filtered working fluid to provide the backwashing and automatically keep the filter clear. Debris is also kept out of the pump section 14 with the pump being protected being jammed by debris and entrained particles in the fluid. Furthermore the close proximity of the pump section 12 and filter section 10 within a combined unit and housing 2 reduces the possibility of additional particles being entrained within the fluid as the fluid flows from the filter section 10 to the pump section 12.

In this embodiment a main pump 14 and a separate backwashing pump 28 which is disposed with the backwashing pump inlet 30 on the suction side of the main pump 14 is provided, with the main pump 14 and backwashing pump 28 drivingly connecting the backwashing pump 28 to the main pump 14. In this way the main pump 14 and backwashing pump 28 are functionally connected so that in use the tendency for an increase in main pump 14 output 8 flow C to cause an increase in fluid flow to the backwashing assembly 29 is offset. Accordingly by this functional connection in this way according to the invention, an decrease in main pump 8 output 8 flow C (due for example to an increase in main pump output 8 resistance) does not lead to an increase in backwashing flow F. On the contrary, and preferably such an decrease in main output 8 flow C causes an decrease in backwashing flow F. Similarly in the reverse situation, the functional connection according to the invention ensures that when an increase in main output 8 flow C occurs the backwashing flow F is at least maintained and preferably is increased.

A further advantage of this arrangement 7 is that the arrangement 7 is significantly more efficient than the prior arrangement and in particular than the arrangement described in GB 2,293,333. With the prior arrangement, of which that described GB 2,293,333 is typical, the fluid for backwashing is taken from a Tee junction in the output of the pump. Such a Tee connection introduces friction resistance and inefficiencies in the flow of backwashing fluid. Furthermore the arrangement of conduits to supply the upstream backwashing assembly also introduces further losses. Typically with units similar to that described in GB 2,393,333, using various different pumps of both centrifugal and positive displacements types, 20 to 25% of the pump output may be required to supply the backwashing assembly. This represents 20–25% of the overall power requirement, in order to provide sufficient flow to the backwashing nozzles. Using the arrangement 7 of the present invention incorporating a separate backwashing pump and impellor 28 it has been found that only 7–10% of the total power is required to provide an equivalent backwashing flow F. Accordingly the arrangement 7 of the present invention provides a significant reduction in the total power required and an improvement in efficiency.

Figure 3:
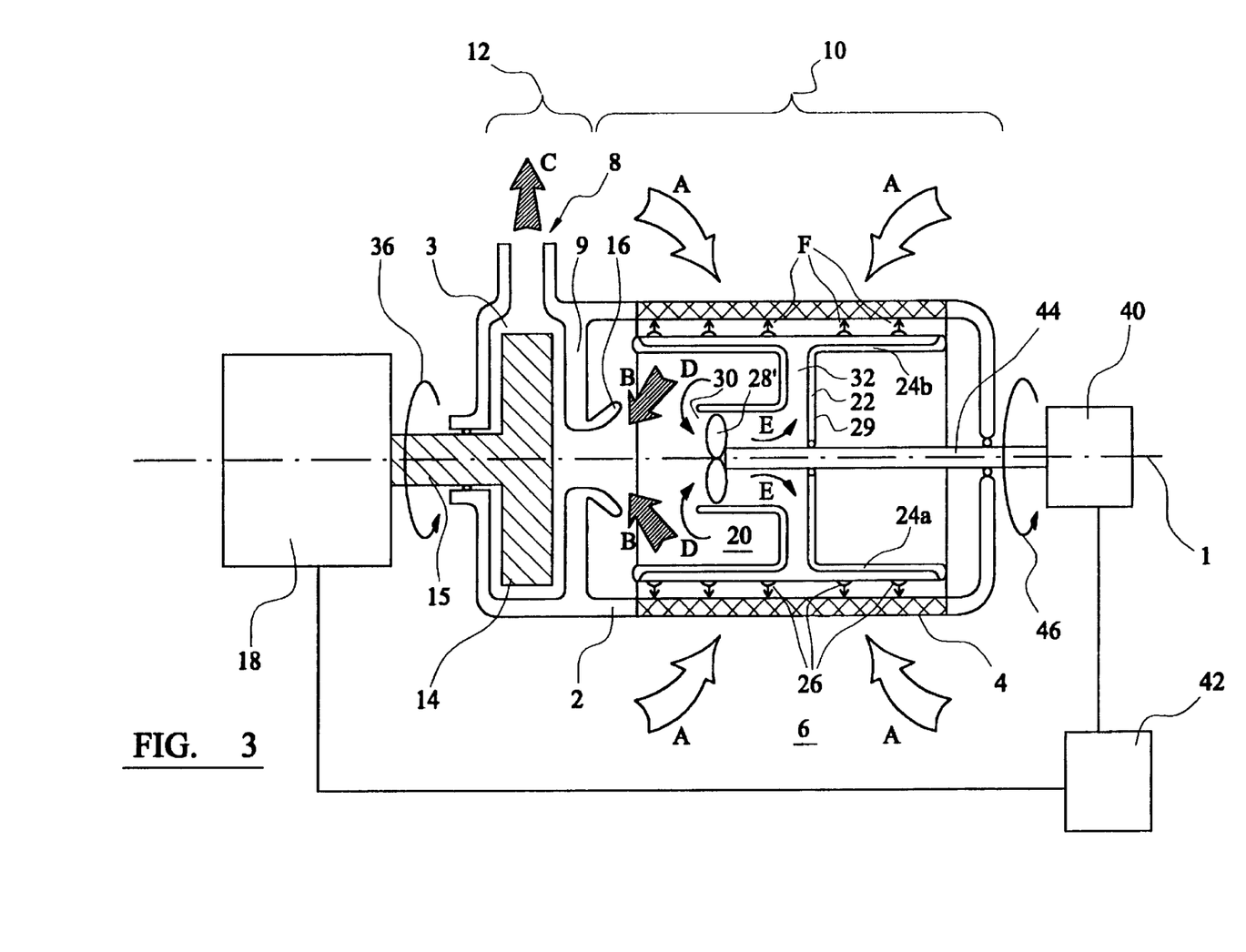
FIG. 3 is a schematic cross section similar to that of FIG. 1 of a second embodiment of the pump and filter assembly according to the present invention.

A second embodiment of the present invention is shown in FIG. 3. This embodiment is generally similar to that described with reference to FIGS. 1 and 2 and consequently only the differences will be described. In addition like reference numerals have been used for like features.

In this embodiment the backwash supply pump means and specifically the backwash impellor 28' are not connected to the main pump 12 and impellor 14. Instead a separate motor 40 is drivingly connected to the backwash supply impellor 28' via a shaft 44. In this way the main pump and backwash pump are not drivingly interconnected and are entirely separate.

A controller 42 is connected to the main pump motor 18 and also to backwash motor 40. Preferably the controller 42 maintains a relationship between the rotational speed of the two motors 18, 40 such that as the main motor 18 increases speed, the backwashing motor 40 speed is also increased. In this way as the main pump impellor 14 rotational speed increases, possibly as a result reduced resistance at the pump outlet 8, the overall flow of working fluid through the assembly 7' will increase. This increases the likelihood of the filter screen assembly 4 becoming blocked since more entrained particles and debris will be drawn into the filter assembly 4. However since the back wash motor 40 speed will also be increased by the controller 42, the flow of backwashing fluid and backwashing of the filter screen assembly 4 will also be increased. This increased backwashing will offset the increased amount of entrained particles and debris drawn into the filter as a result of the increased flow.

The controller 42 in this embodiment provides in this arrangement a functional connection between the main pump and backwashing assembly 29. This functional connection arranged and providing the means so that in use the tendency for an increase in main pump output 8 flow resistance, and so decrease in main pump output flow C, to cause an increase in fluid flow to the backwashing assembly 29 is offset. The functional connection and arrangement furthermore preferably providing that in response to a decrease in main pump output 8 flow C there is a decrease in backwashing flow F and similarly that in response to an increase in main pump output 8 flow C there is an increase in backwashing flow F.

By fine tuning the relationship between the motor 18, 40 provided by the controller 42 the system can be optimised and the required degree of backwashing and clearance of debris and entrained particles from the filter screen assembly 4 can be maintained under varied operating conditions to keep the filter screen assembly 4 clear and unobstructed.

Although this embodiment is slightly more complicated than that of FIG. 1, and requires a further motor 18, it has the further advantage that within the combined pump and filter unit and system 7' the backwashing and pump sections are entirely separate and unconnected. Therefore whilst the backwashing will vary with changes in the pumping section 12 as required, both the pumping section 12 and backwashing will have no effect on each other. With the previous embodiment since the main pump impellor 14 and backwashing pump impellor 28 have a common drive, increased load on the main pump impellor 14 will slow down the backwashing pump impellor 28.

This second embodiment also has the advantage that the variation of the backwashing in response to changes in the operation of the main pump can be better optimised and adjusted with more control via the controller 42. In particular different relationships between the amount of backwashing for an the main pump speed can be used for different parts of the operating range. In other words a non-constant and/or non-linear relationship can be used using the controller 42 and separate motors 18, 40. Furthermore further transducers monitoring the operation of the assembly 7' and pressures could be incorporated with the controller 42 to provide yet further control.

In either of the systems 7, 7' shown in the figures the backwashing assembly 29 could be connected to the backwashing impellor 28 and/or to the main pump impellor and/or to the motors 18, 40. By such connection a more direct and reliable rotation of the backwashing assembly 29 could be provided than is the case with relying on the discharge from the nozzles to rotate the assembly 29.

It will also be appreciated that although these systems are shown and described as simply drawing in fluid from a region 6 surrounding the system 7, 7' in alternative embodiments further conduit means could be arranged to duct the fluid to the filter screen assembly 4.

In the above embodiments the backwashing pump means 31 has been described as being of an axial flow type. It will be appreciated though that in other embodiments the backwashing pump and backwashing impellor 28 could be of a radial flow, centrifugal type.

The backwashing assembly 29 has also been described as including a number of nozzles 26 for directing the backwashing flow F to clear the filter screen assembly 4. It will be appreciated that these nozzles 26 could be of any known conventional type used in backwashing assemblies. Preferably however the nozzles 26 are made from an elastomer which defines an orifice through which a jet of fluid is discharged. In this way due to the resilience of the elastomer material the orifice can open to allow any remaining debris particles to pass through and so prevent blocking of the nozzles 26. Such a nozzle 26 made from an elastomer is described in GB 2,293,333. The number of individual nozzles 26 could also be amalgamated and replaced with one large nozzle in the form essentially of a slit to provide a single wide but thin jet. Such a slit like nozzle is simpler to manufacture than a series of nozzles 26 and ensures that a more uniform jet and flow F of backwashing fluid is directed at the backwashing screen assembly 4.

Two further embodiments corresponding to those shown in FIGS. 1 and 3, but incorporating such alternatives as are described above are shown in FIGS. 4 and 5.

Figure 4:
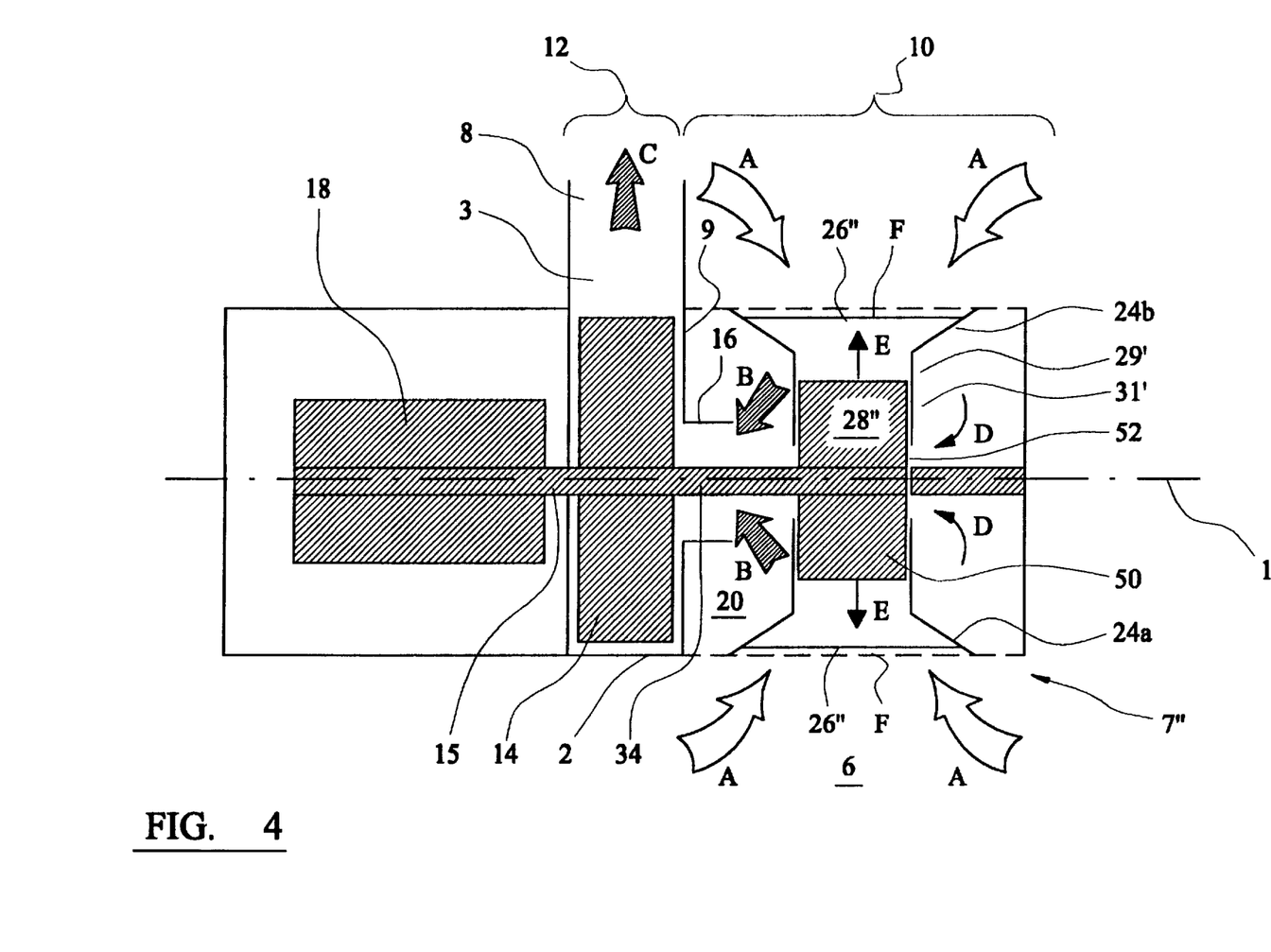
FIGS. 4 and 5 are schematic cross sections of further embodiments of pump and filter assemblies according to the present invention.
Figure 5:
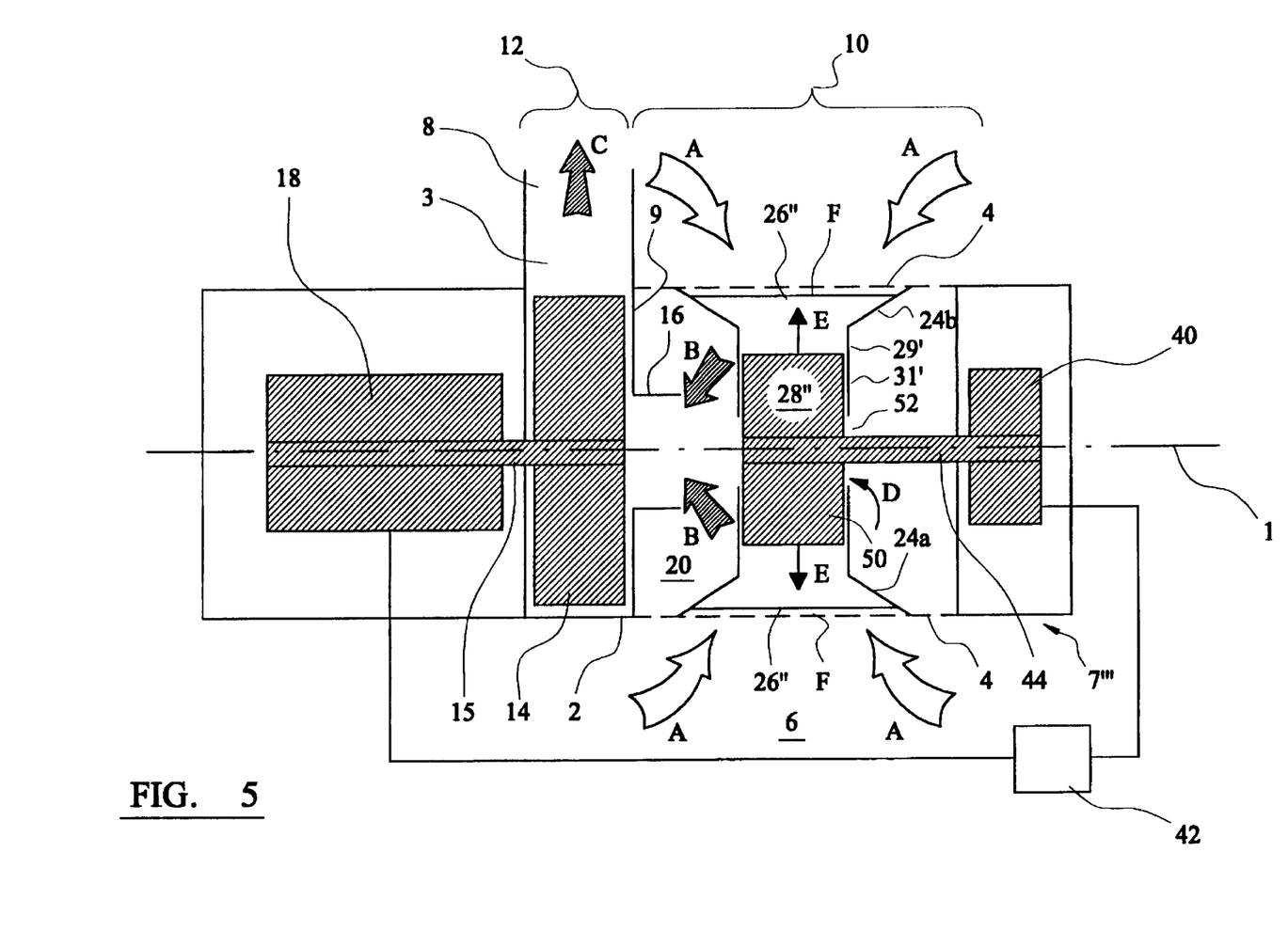
Figure 6:
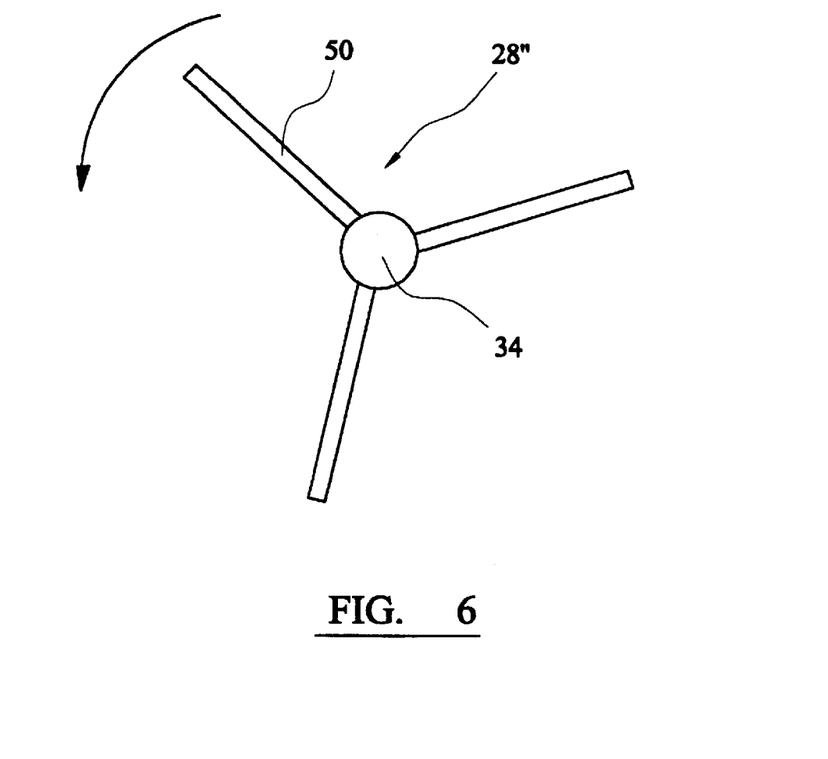
FIG. 6 is an axial view of the radial flow backwashing impellor of the embodiments shown in FIGS. 4 and 5.

In FIGS. 4 and 5 like reference numerals have been used for the like features shown in FIGS. 1 and 3 and the arrangements are generally the same as the previous embodiments. The arrangement 7" of FIG. 4 corresponds generally to the embodiment of FIG. 2, whilst the arrangement 7'" of FIG. 5 corresponds generally to the embodiment of FIG. 3 and includes a separate backwashing motor 40. The backwashing means 31' and backwashing impellor 28" however are of a radial flow type comprising radial vanes 50 which are arranged to draw in backwashing fluid from the internal filter chamber 20 through an inlet 52 and propels the backwashing fluid radially outwardly to backwashing nozzles 28". The backwashing impellor 28" including the vanes 50 is shown in more detail FIG. 6, and is generally similar to the centrifugal radial flow main pump impellor 14. Such radial flow pumps are generally well known in the art. Furthermore the filter nozzles 28" comprise a single axially extending thin slot which extends along the axial length of the rail members 24a, 24b. Such a slit nozzle 28" provides in use a jet of backwashing fluid flow in the form of a wide sheet like jet F' which is directed at and over the axial length of the filter screen assembly 4.

The illustrated embodiments shown in the figures and described above show dual pump arrangements having dual pump rotors which achieve the offsetting advantage discussed above.

Other ways of achieving a related offset may be devised in terms of flow control means providing a relationship between the output flows of the pump assembly to its main output and to its subsidiary backwashing function.

Amongst other modifications which could be made in the above embodiments are the following:

a) The use of various different kind of pumps including positive displacement as well as centrifugal pumps;
b) The use of entirely separate pump units or separate pump units having a common drive;
c) The use of the invention in relation to gas filtration as well as for liquid filtration; and the use of alternative arrangements for backwashing and indeed alternative systems for filter clearing or cleaning other than backwashing itself, whether in combination with backwashing or not.

What is claimed is:

1. A compressor pump and filter assembly comprising in flow series:
   a) an inlet in communication with a source of fluid and arranged in use to admit a flow of fluid from said source,
   b) a filter assembly which is adapted in use to filter the flow of fluid admitted through said inlet and to obstruct any debris entrained within the fluid,
   c) a main pump which is connected to a main pump drive,
   d) a main outlet which is connected to the main pump and through which fluid is admitted through the inlet and filter assembly is discharged by operation of the main pump as a main output flow, the assembly also including a backwashing means which is supplied with a flow of backwashing fluid and which is arranged, in use, for backwashing the filter in use to remove any debris from the filter;

characterized in that the pump and filter assemblies are combined into a single unit, and that there is a backwashing pump which is arranged, in use, to supply backwashing fluid to the backwashing means, the backwashing pump and main pump are functionally connected with means for offsetting the tendency for an increase in pump outflow resistance to cause an increase in fluid flow to the backwashing assembly.

2. A combined pump and filter assembly as claimed in claim 1 in which the backwashing pump is drivingly connected to the main pump and drive.

3. A combined pump and filter assembly as claimed in claim 1 in which backwashing pump is drivingly connected to a backwashing drive which is separate to the main pump drive, the backwashing drive and main pump drive are connected to a controller which maintains a relationship between the outputs of the main pump and the backwashing pump and offsets the tendency for an increase in the main pump output resistance to cause an increase in fluid flow to the backwashing assembly.

4. A combined pump and filter assembly as claimed in any preceding claim in which an inlet to the backwashing pump is disposed on a suction side of the main pump so that in use the backwashing flow is drawn from the suction side of the main pump.

5. A combined pump and filter assembly comprising backwashing means for the filter assembly and comprising means for offsetting the tendency for an increase in pump output flow resistance to cause an increase in fluid flow to the backwashing assembly.

6. A combined pump and filter assembly as claimed in claim 5 in which the means for offsetting the tendency for increased flow to the backwashing assembly to occur is provided by the use of dual pump means for the main pump output and the backwashing function.

7. A combined pump and filter assembly as claimed in claim 6 in which the dual pump means are drivingly connected to a common drive.

8. A combined pump and filter assembly as claimed in claim 7 in which the dual pump means are coaxially disposed and a shaft drivingly interconnects the dual pump means to a common drive means.

9. A combined pump and filter assembly as claimed in claim 6 in which each of the pumps of the dual pump means are drivingly connected to separate independent drive means, the independent drive means being connected to a control means which maintains a relationship between the outputs of the dual pump means and provides the means for offsetting the tendency for an increase in the main pump output resistance to cause an increase in fluid flow to the backwashing assembly.

10. A combined pump and filter assembly as claimed in any preceding claim in which the pump and filter assembly are combined into a single unit.

11. A combined pump and filter assembly as claimed in any preceding claim in which the filter assembly, and pump are arranged in flow series, the assembly comprising a main pump to provide a main outlet flow from a pressure side of the main pump, and the backwashing means being arranged so that a supply of fluid for the backwashing means is provided from a suction side of the main pump.

12. A combined pump and filter assembly as claimed in any preceding claim in which means are provided to increase the backwashing flow in response to an increase in the pump output flow.

13. A method of operating a pump which is adapted to drive a filter and backwashing assembly wherein dual output facilities are provided by said pump, the method including the step of arranging and operating the pump so that an increase in flow resistance in one output of the pump causes a less than a proportionate increase in fluid flow to the other output of the pump, the latter being the output adapted for the connection to the backwashing assembly.

14. A method according to claim 11 wherein said method of operating the pump comprises providing dual pumping means having at least a degree of independence of operation whereby a reduction in flow output from one portion of the pump due to flow resistance is accompanied by less than a proportionate corresponding increase in output of the other pump function.

15. A method of operating a combined pump and filter assembly comprising a pump and filter assembly arranged in flow series and backwashing means for backwashing the filter assembly, the method including the step of arranging and operating the combined pump and filter assembly so that in response to an increase in output flow from the combined assembly a flow of fluid to the backwashing means is maintained at at least substantially the same level.

16. A method as claimed in any one of claims 10 to 12 in which in response to an increase in output flow from the pump a flow of fluid to the backwashing means is increased.

* * * * *

UNITED STATES PATENT AND TRADEMARK OFFICE
CERTIFICATE OF CORRECTION

PATENT NO.    : 6,520,752 B1                                             Page 1 of 1
DATED         : February 18, 2003
INVENTOR(S)   : James Peter Hosford It is certified that error appears in the above-identified patent and that said Letters Patent is hereby corrected as shown below:

Column 8,
Line 25, please delete "any preceding" and after "claim" insert -- 1 --.
Line 57, please delete "any preceding" and after "claim" insert -- 5 --.
Line 60, please delete "any preceding" and after "claim" insert -- 5 --.
Line 67, please delete "any preceding" and after "claim" insert -- 5 --.

Column 10,
Line 11, please delete "any one of claims 10 to 12" and insert -- claim 10 --.

Signed and Sealed this

Twenty-second Day of July, 2003

JAMES E. ROGAN
*Director of the United States Patent and Trademark Office*